United States Patent [19]

Kaufman

[11] Patent Number: 5,791,726
[45] Date of Patent: Aug. 11, 1998

[54] STAKELESS LIVESTOCK TRAILER

[75] Inventor: Thomas N. Kaufman, Hillsboro, Kans.

[73] Assignee: Hillsboro Industries, Inc., Hillsboro, Kans.

[21] Appl. No.: 606,392

[22] Filed: Feb. 23, 1996

[51] Int. Cl.[6] ............................................. B62D 33/00
[52] U.S. Cl. ...................... 296/181; 296/183; 296/191; 296/37.1; 296/24.2; 280/433
[58] Field of Search ............................. 296/24.2, 181, 296/182, 901, 183, 204, 191, 37.1; 280/789, 798, 433

[56] References Cited

U.S. PATENT DOCUMENTS

| | | | |
|---|---|---|---|
| 2,356,008 | 8/1944 | Schafer | 296/181 |
| 2,753,018 | 7/1956 | Curell | |
| 2,839,327 | 6/1958 | Simpkins | |
| 2,991,116 | 7/1961 | Andrews | |
| 3,156,503 | 11/1964 | Chieger | |
| 3,198,548 | 8/1965 | Lund | 280/433 X |
| 3,760,548 | 9/1973 | Sauer et al. | |
| 3,886,705 | 6/1975 | Cornland | |
| 4,222,606 | 9/1980 | Brown et al. | 296/183 |
| 4,840,422 | 6/1989 | Engel | 296/24.2 X |
| 5,052,741 | 10/1991 | Brown et al. | 296/191 |
| 5,140,913 | 8/1992 | Takeichi et al. | 296/191 X |
| 5,267,515 | 12/1993 | Tsuruda et al. | 296/187 X |
| 5,403,062 | 4/1995 | Sjostedt et al. | 296/181 |

FOREIGN PATENT DOCUMENTS

| | | | |
|---|---|---|---|
| 2088284 | 8/1993 | Canada . | |
| 2097340 | 10/1994 | Canada . | |
| 1497184 | 8/1967 | France | 296/191 |
| 2510061 | 1/1983 | France | 296/181 |
| 1093222 | 11/1960 | Germany | 296/183 |
| 842388 | 7/1960 | United Kingdom | 296/183 |
| 1455564 | 11/1976 | United Kingdom | 296/182 |

OTHER PUBLICATIONS

Undated Jamco brochure.

*Primary Examiner*—Dennis H. Pedder
*Attorney, Agent, or Firm*—Litman, McMahon & Brown, L.L.C.

[57] ABSTRACT

An improved, stakeless livestock trailer includes sidewalls and a front wall constructed of stacked and interlocked extruded tubular members. In addition to forming the walls, the tubular members also form the exterior framework of the trailer, allowing a modular floor system to be attached directly to the sidewalls. The tubular members themselves have a unique tongue and groove interlocking structure which allows an adhesive to be inserted therebetween and which provides interior voids for excessive adhesive to collect during assembly. An improved gooseneck design eliminates the large support I beams required by prior art gooseneck designs, thus increasing storage space and/or increasing the clearance of an overhead storage compartment.

13 Claims, 5 Drawing Sheets

STAKELESS LIVESTOCK TRAILER

FIELD OF THE INVENTION

The present invention relates to a stakeless livestock trailer, and, more particularly, to a livestock trailer with sides constructed of extruded aluminum tubular members. The tubular members have a tongue and groove design such that, when stacked vertically, they interlock to form walls. A special adhesive is used to adhere the tubular members together to form a rigid trailer structure. The trailer incorporates an improved gooseneck design as well.

BACKGROUND OF THE INVENTION

Figure 1:
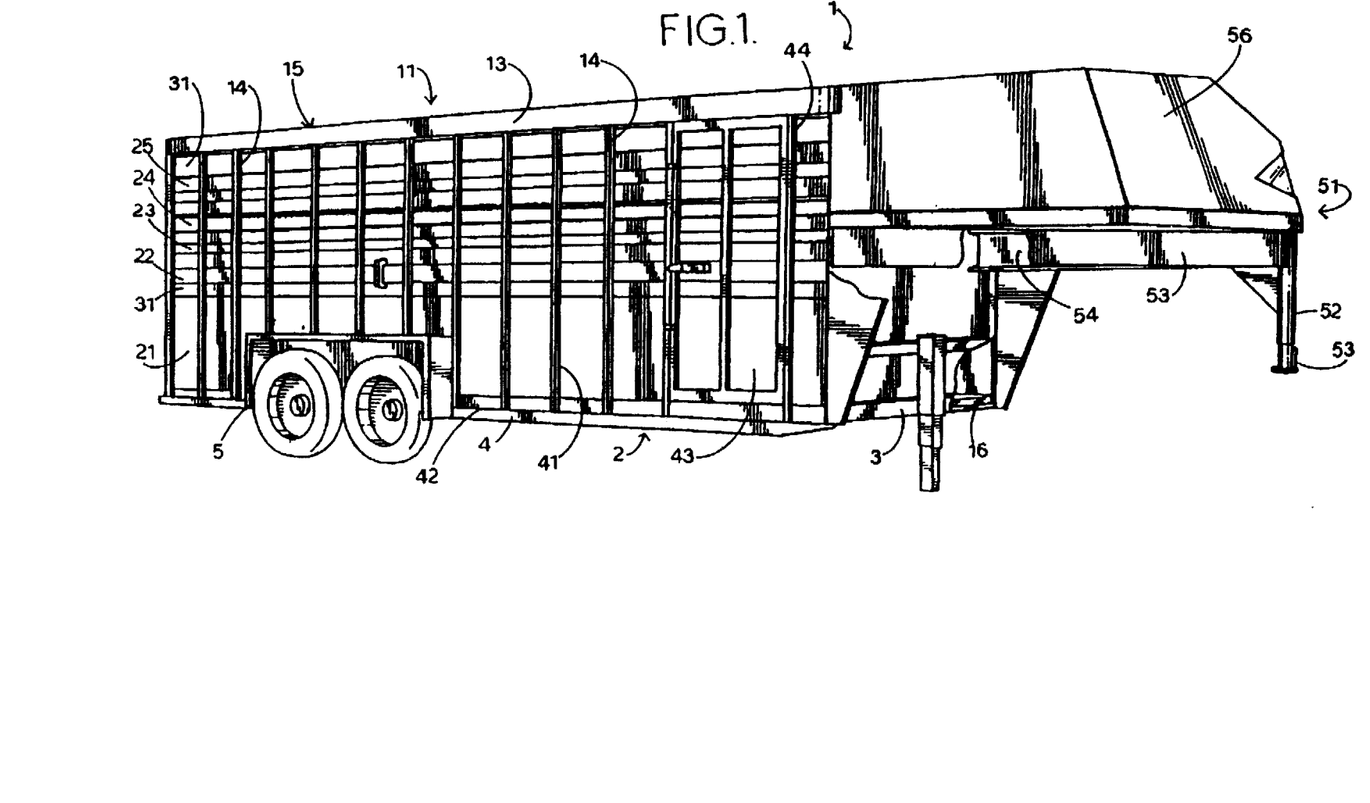
FIG. 1 is a perspective view of a prior art livestock trailer with conventional stake supported sidewalls and a conventional gooseneck.
Figure 2:
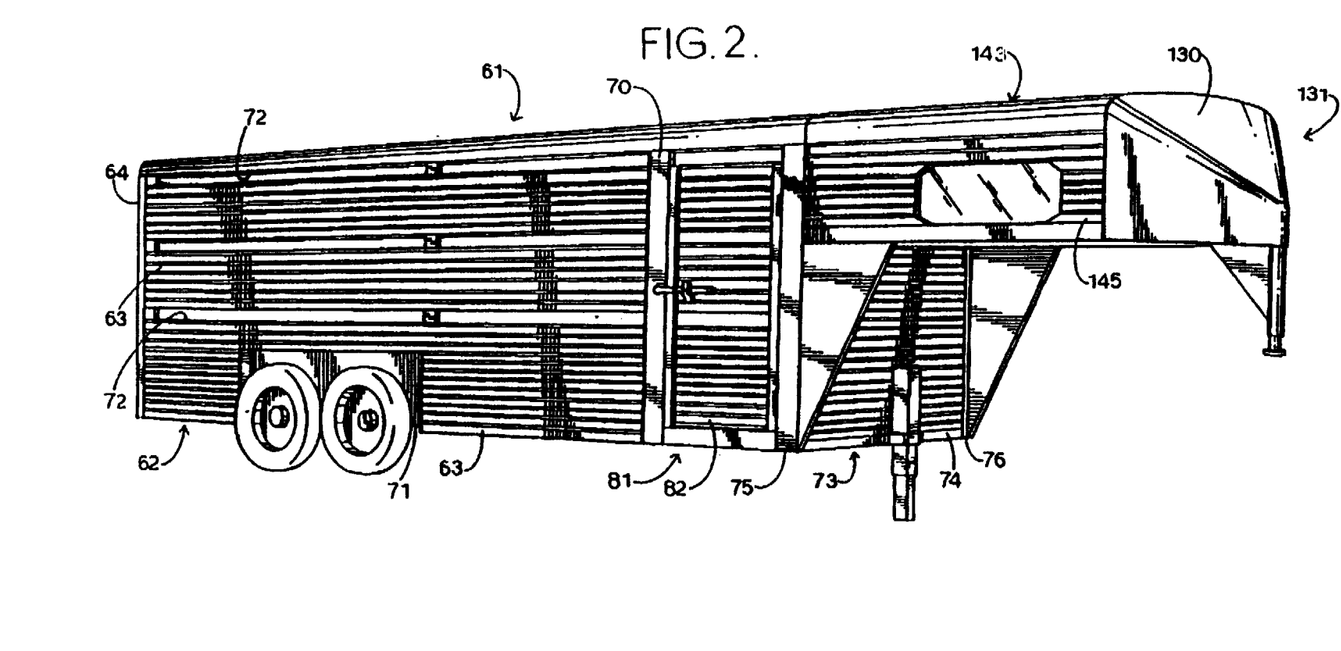
FIG. 2 is a perspective view of an improved, stakeless livestock trailer in accordance with the present invention equipped with an improved gooseneck arrangement.

Livestock trailers are made by a wide variety of manufacturers, both large and small. However, in recent years, virtually all livestock trailers have taken the same general form. A bottom frame is made of steel or aluminum I beams or the like with a floor fitted to and supported by the bottom frame. A number of vertical support rods or "stakes" are then attached to and extend vertically upward from the bottom frame to a roof structure. These stakes tie the roof and floor together and are the major structural members forming the sidewalls. An outer skin is then put on the trailer sidewalls by attaching thin aluminum panels to the stakes, by spot welding or the like. The panels can be attached to the outside of the stakes, or, alternatively, can be attached to the inside of the stakes. A typical prior art livestock trailer is shown in FIG. 1. The illustrated trailer, which will be described in greater detail below, has the aluminum panels welded to the insides of the stakes.

Either arrangement of prior art trailer, i.e. with the panels inside of or outside of the stakes, has its own particular disadvantages.

If the panels are attached inside of the stakes, as shown in FIG. 1, the exterior visual lines of the trailer are broken up and do not appear to be streamlined. Wind resistance of the trailer is increased due to the exposed stakes. With the stakes positioned outside of the panels, the exterior of the trailer is very difficult to clean and to keep clean, since each intersection of a stake and a panel acts as a collector for dirt and debris.

Alternatively, if the panels are attached to the outside of the stakes, the exterior trailer appearance is enhanced, but the problems of multiple collectors for dirt and debris are moved inside where the problems are greatly multiplied. With livestock, such as cattle or horses occupying the trailer, manure and other animal waste collects at the intersections of stakes and panels, making the trailer interior very difficult to clean. Furthermore, the stakes, when positioned on the trailer interior, present obstacles which livestock can run into or rub against, causing irritation or even injury, particularly when the trailer is moving and is stopped suddenly or turned quickly.

In prior art trailers, whether the panels are attached inside of or outside of the stakes, the weld spots tend to be unsightly.

Many livestock trailer manufacturers offer a gooseneck design which allows for optimum towing conditions and turning radiuses by a tow vehicle such as a pick-up or flat bed truck. Gooseneck trailers also typically include a storage compartment above the gooseneck for storing tack, hay and feed or other materials. In some trailers, a sleeping compartment is provided in this area. Known gooseneck designs for livestock trailers include a vertical support member (the "gooseneck") which is attached to and extends upward from the middle of the towing vehicle bed. A pair of I beams each have one end attached to the upper end of the gooseneck. The attached I beams diverge from the gooseneck to form a V with the other end of each I beam meeting the front corner of the main trailer body. The gooseneck and the I beams carry and distribute the entire static tongue weight of the vehicle as well as the inertial loads imposed during transport. Typically the storage compartment, if there is one, is simply a framed in box attached above the I beams, performing no structural function. A problem with this arrangement is that, to adequately carry this weight and these loads, the I beams must be rather deep, e.g. 6" to 8" in depth, which decreases the clearance of the trailer above the towing vehicle, or alternatively, takes potential space out of the storage compartment above the I beams.

Accordingly, it is clear that a need exists for an improved livestock trailer which avoids the problems of the prior art. Such an improved trailer should preferably have smooth outer and inner sidewalls, should be capable of thorough and efficient cleaning, and should be streamlined and attractive in appearance. The improved trailer should also have an improved gooseneck design which optimizes clearance and/or maximizes storage space in a compartment above the towing vehicle.

SUMMARY OF THE INVENTION

The present invention is directed to an improved, stakeless livestock trailer with sidewalls, front wall and the gates constructed of stacked and interlocked extruded tubular members. The tubular members also form the exterior framework of the trailer, allowing the floor to be attached directly to the sidewalls. The trailer floor is formed of a unique interlocking structure with integral subfloor strengthening ribs which extend across the trailer width. The tubular members themselves have a unique tongue and groove interlocking structure which allows an adhesive to be inserted therebetween and which provides interior voids for any excessive adhesive to collect during assembly. The only vertical supports required are provided at the trailer corners, and by door frames and interior gate supports. An improved gooseneck design eliminates the large I beams required by prior art designs. In the improved gooseneck, the vertically oriented gooseneck is extended upward to the top of the storage compartment. The front wall of the storage compartment is attached to the gooseneck, with the front storage compartment wall distributing the vertical static tongue weight load to the compartment corners. The gooseneck is also attached to a pair of brackets which brackets extend through the front compartment wall and are attached to respective upper and lower longitudinal frame members to carry the horizontal inertial loads imposed by towing and braking, etc.

OBJECTS AND ADVANTAGES OF THE INVENTION

The principal objects of the present invention include: to provide an improved stakeless livestock trailer; to provide such a trailer with at least the sidewalls, front wall and the gates constructed of stacked, interlocked tubular members; to provide such a trailer with smooth outer and inner walls; to provide such a trailer where the sidewalls and the front wall form the exterior frame thereof; to provide such a trailer with a floor formed of unique interlocking members which are welded directly to the sidewalls and the front wall; to provide such a trailer with the tubular members being attached together via a unique interlocking arrangement and with an inventive adhesive; to provide such a trailer with an improved gooseneck design which enhances clearance above the towing vehicle and/or storage space in a gooseneck storage compartment; and to provide such a trailer which is easily and economically assembled, which is extremely durable, and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

I. Prior Art Livestock Trailer

Referring to drawing FIG. 1, the reference numeral 1 generally designates a prior art livestock trailer. The trailer 1 includes a rectangular lower trailer frame assembly 2 including a horizontal front frame member 3 and a matching horizontal rear frame member (not shown) and a pair of matching horizontal side frame members 4. The horizontal side frame members 4 accommodate respective wheel wells 5. A rectangular upper trailer frame 11 includes a pair of matching horizontal side frame members 13. A plurality of vertically oriented support stakes 14 are attached to and extend between the lower side frame members 4 and the upper side frame members 13. A roof structure 15 is supported by the stakes 14 and the upper trailer frame 11 and a floor 16 is supported by the lower frame 2.

A plurality of panels 21, 22, 23, 24 and 25 are attached to the inside of the stakes 14, preferably by spot welding. The panels 21-25 are separated to yield a plurality of gaps 31 for purposes of air flow within the trailer 1. At the junctures between each stake 14 and each of the panels 21-25, right angle ledges 41 are created. Similarly, on the floor 16, outside of the panels 21-25 and between the stakes 14, a plurality of shelves 42 are formed. The ledges 41 collectively present a substantial surface for catching air flow, thus detrimentally affecting the aerodynamic qualities of the trailer 1. In addition, the ledges 41 and the shelves 42 provide collection points for dirt and debris, causing the trailer 1 to be difficult to clean and to keep clean. Furthermore, the stakes 14, as can readily be seen from the view in FIG. 1, detract from the appearance of the trailer 1 by breaking up the symmetrical visual lines.

The trailer 1 has a conventional side door 43 hingedly secured within a door frame 44 and a rear gate (not shown) which provide interior access thereto.

The trailer 1 includes a conventional gooseneck structure, generally indicated at 51. The gooseneck structure 51 includes a vertical gooseneck 52 with an extension 53 for insertion in a mating socket on a tow vehicle (not shown). The gooseneck 52 is connected to one end of each of a pair of I beams 53 and 54. The I beams 53 and 54 diverge from the gooseneck 52 toward the front corners of the main body of the trailer 1 to form a V with the other end of each I beam 53 and 54 being attached to the respective front corner, such as the attachment of the I beam 53 to front corner 55. The gooseneck 52 and the I beams 53 and 54 carry and distribute the entire static tongue weight of the trailer 1 as well as the inertial loads imposed during transport. A storage compartment 56 is framed in above and supported by the I beams 53 and 54. The compartment 56 performs no structural function. As clearly illustrated in FIG. 1, to adequately carry the tongue weight and the inertial loads, the I beams 53 and 54 must be rather deep, e.g. 6" to 8" in depth, which decreases the clearance of the trailer 1 above the towing vehicle, or, alternatively, takes potential space out of the storage compartment 56.

II. Improved Stakeless Livestock Trailer

Referring to FIGS. 2–6, an improved stakeless livestock trailer in accordance with the present invention, is generally indicated by the numeral 61. The trailer 61 has sidewalls 62 formed of a number of stacked, interlocked aluminum tubular members 63 which are attached to and extend between rear corner posts 64 (only one of which is shown) and a rear vertical door frame support 70, with the lowermost tubular members 63 being interrupted by a wheel well 71. The trailer 61 has been shown as including air circulation gaps 72 between certain of the tubular members 63. A front wall 73 is formed by stacked, interlocked tubular members 74 attached to and extending between a pair of front corner posts 75 and 76. The rear corner post 64 and the front corner posts 75 and 76 preferably include slots (not shown) for receiving respective ends of the tubular members 63, 74, etc. to provide a seal. A side door 81 comprises a series of stacked tubular members 82 extending between vertical posts 83 with the door 81 being hingedly supported between the front corner post 75 and the rear door frame support 70.

Figures 3, 4:
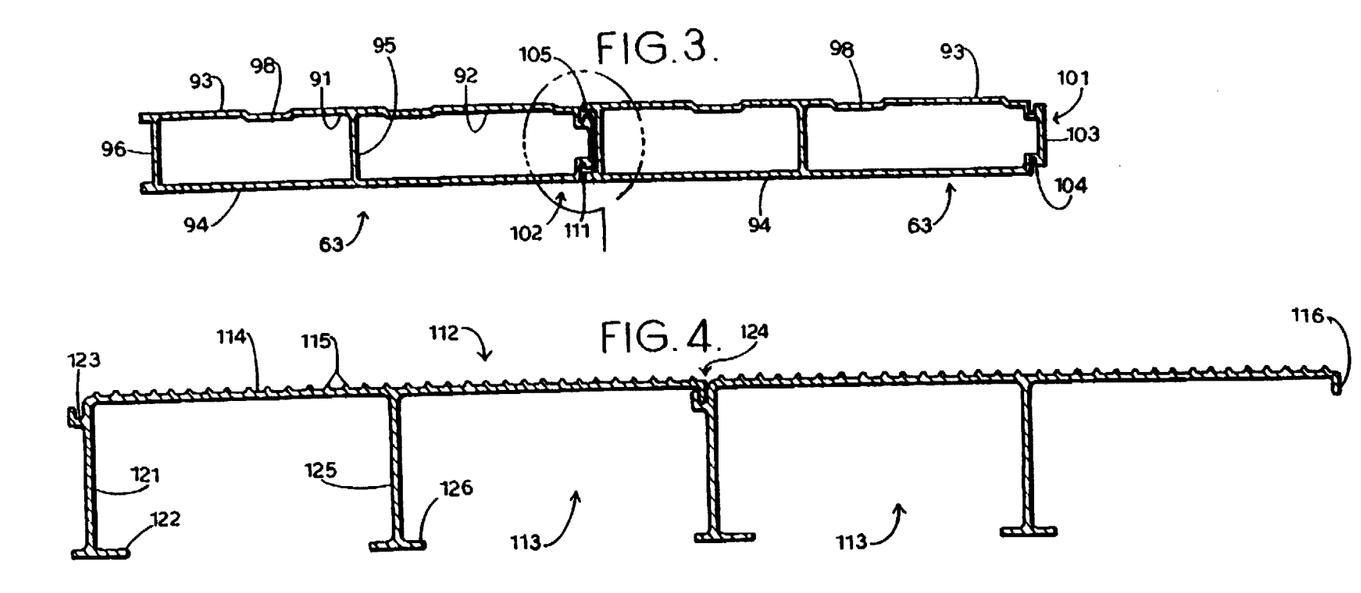
FIG. 3 is a cross-sectional view of a pair of tubular wall members interlocked and adhered together with an adhesive.
FIG. 4 is a cross-sectional view of a pair of modular floor members connected together to form a portion of the trailer floor.
Figure 7:
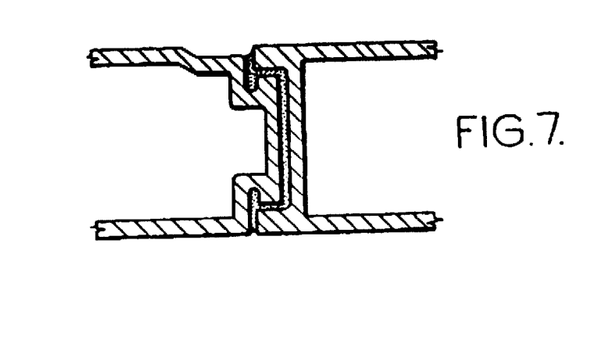
FIG. 7 is an enlarged, fragmentary, view of the circled portion of FIG. 3 labeled as 7, illustrating a magnified view of the junction between tubular members.

Referring to FIGS. 3 and 7, a greatly enlarged cross-sectional view of a pair of interlocked tubular members 63 is illustrated. Each tubular member 63 includes a pair of chambers 91 and 92 enclosed by walls 93 and 94 and separated by an internal divider 95. The tubular members 63 are preferably made of extruded aluminum. Each tubular member 63 includes a bottom channel 96 formed by short extensions of the sidewalls 93 and 94 which extend past a bottom closure 97. The outer wall 93 can be formed with indentations 98 for decorative purposes. The channel 96 is sized to receive a tongue 101 of an adjacent tubular member 63, to form a junction generally indicated at 102. Each tongue 101 has a flat surface 103 with a width which is slightly narrower than that of the channel 96. Below the surface 103 the sides 93 and 94 taper inward to form a pair of grooves 104 which extend longitudinally along the tubular members 63. The junctions 102, as shown magnified in FIG. 7, are formed by placing a quantity of an adhesive 105 in the channel 96. The adhesive 105, in one embodiment, was a modified acrylic structural adhesive such as "Versilock HI 400 Series" manufactured by Lord Corporation. The tongue 101 of the adjacent tubular member 63 is then pushed into the channel 96, causing the adhesive 105 to spread evenly in a gap 111 between the tongue 101 and the channel 96. The grooves 104 provide a reservoir for excess quantities of adhesive 105 to collect without being forced out of the junction 102. Once the adhesive 105 sets up, the junction formed between the adjacent tubular members 63 is extremely strong and durable. It should be noted that the front wall tubular members 74 and the side door tubular members 82 have a cross-section which is identical to the members 63 and they are connected together in the same fashion.

Figure 6:
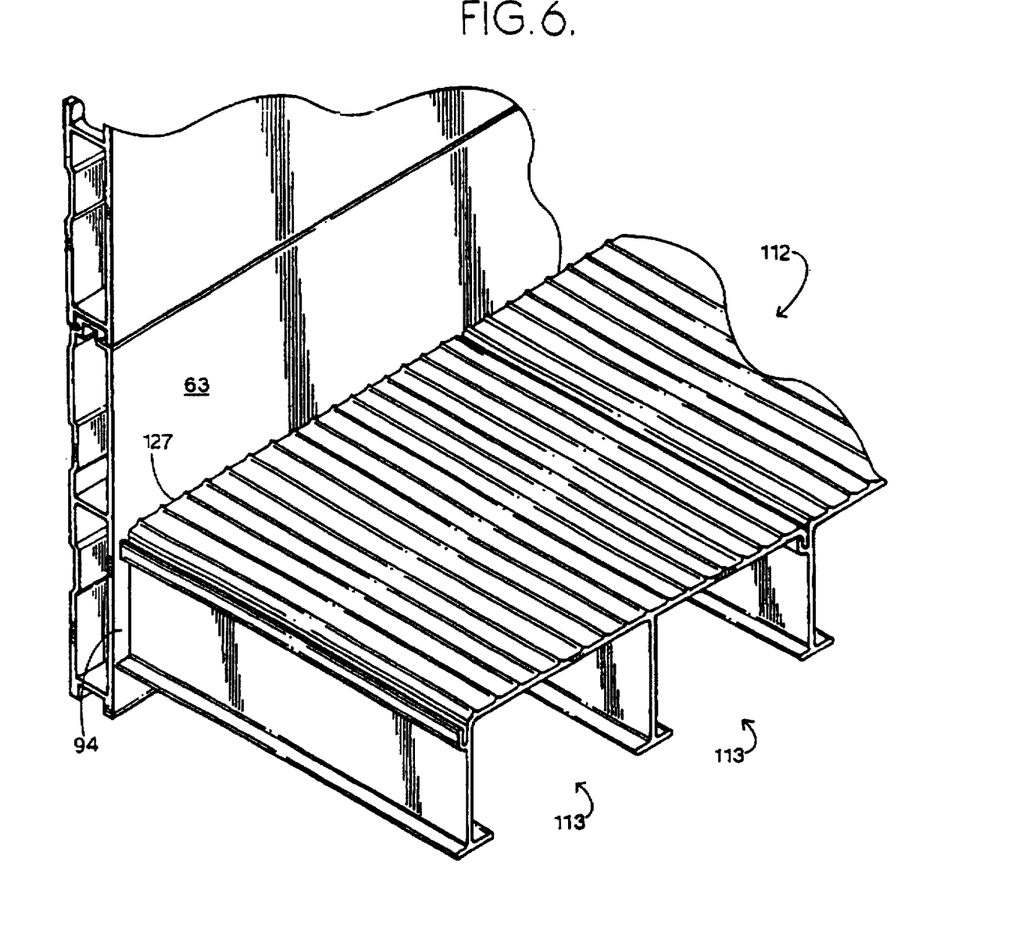
FIG. 6 is an enlarged, fragmentary, perspective view of a portion of the floor and a portion of one sidewall of the trailer of FIG. 2, illustrating the connection of the trailer floor directly to the lowest tubular member in the sidewall.

In the trailer 61, the trailer peripheral frame is formed by the lowermost connected tubular members 63 and 74. Thus there is no peripheral ledge to support a floor. Therefore, a unique floor system 112 has been designed for the trailer 61, as shown in FIGS. 4 and 6. The floor system 112 includes a number of separate, identical modular members 113. Each modular floor member 113 includes a web 114, the top surface of which forms an expanse of horizontal floor which is preferably formed with ridges 115, as shown, to provide a non-slip surface. The web 114 terminates at one end in a downwardly directed hook member 116. The opposite end of the web 114 leads into a strengthening rib 121 which terminates in a foot portion 122. Attached alongside the strengthening rib 121 is an upwardly directed receiving slot 123 which is sized to mate with the hook member 115 of an adjacent modular member 113. The mating hook 115 and slot 123 form a junction, as indicated at 124. Although not necessary, the junctions 124 can be cemented together with an adhesive such as the adhesive 105 which cements the tubular members 63 together. Each modular floor member 113 also includes an intermediate strengthening rib 125 attached beneath the web 114 approximately one half of the distance between the respective ends thereof. The intermediate strengthening ribs 125 also terminate in foot portions 126. The modular floor members 113, when interlocked together, make the floor system 112 extremely strong. The modular floor members 113 are also preferably made of extruded aluminum. As shown in FIG. 6, since the tubular members 63 form the trailer frame, the floor system 112 is attached to the trailer sides by welding respective ends 127 of the modular floor members 113 directly to the inner walls 94 of the bottommost tubular member 63. This creates an integrated trailer structure which has proven to be very strong and durable.

Figure 5:
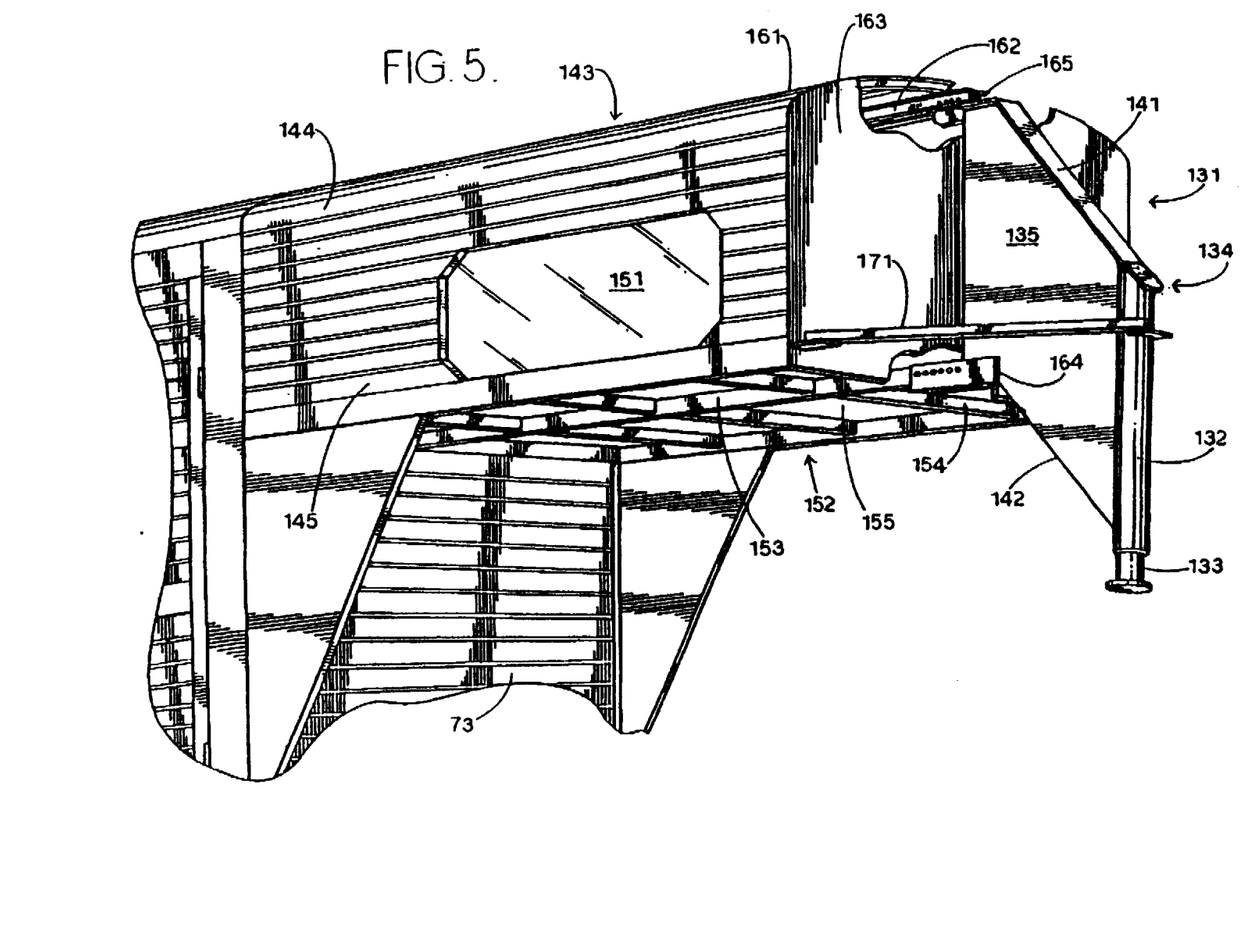
FIG. 5 is an enlarged, fragmentary, perspective view of the gooseneck and front storage compartment of the trailer of FIG. 2, with a decorative front shield removed and with a portion of the front wall broken away to illustrate the interior thereof.

Referring again to FIG. 2, as well as FIG. 5, the trailer 61, when fully assembled, includes a front decorative and streamlining shield 130, which is shown as removed in FIG. 5. The trailer 61 includes an improved gooseneck assembly, generally indicated at 131. The assembly 131 includes a vertically oriented gooseneck 132 with a conventional insert 133 adapted to mate with a socket in a towing vehicle (not shown). The gooseneck 132 is connected to a buttress 134 which extends upward at a diagonal angle nearly to the roof line of the trailer 61. The buttress 134 is essentially a steel box with side plates 135 and an overhanging top plate 141 and a flush bottom plate 142. The trailer 61 includes a front storage compartment 143 with sidewalls 144 constructed of interlocking tubular members 145, which can collectively have an opening forming a window 151. A bottom frame assembly 152 comprises a center support 153 extending longitudinally from the buttress 134 to the front wall 73 of the trailer 61. A number of cross ties 154 extend laterally outward from the center support 153 to the lowermost tubular member 145 of the sidewalls 144. The frame assembly 152 supports a compartment floor 155. The compartment 143 has a curved roof 161 with an upper center support 162 extending longitudinally from the top of the buttress 134 to the front wall 73 of the trailer 61. A compartment front wall 163 is made of fairly heavy gauge sheet metal and the front wall 163 is welded or otherwise securely attached to the buttress 134. A lower bracket 164 is attached between the lower portion of the buttress 134 and the lower center support 153, extending through the front wall 163. An upper bracket 165 is similarly attached between the upper portion of the buttress 134 and the upper center support 162, also extending through the front wall 163. An pair of braces 171 extend between the buttress 134 and respective front corners of the compartment 143 to provide support for the decorative shield 130. The gooseneck assembly 131 differs from prior art goosenecks, as shown in FIG. 1, in that the vertical tongue weight loads are carried by the buttress 134 and the gooseneck 132 and distributed to the sidewalls 144 by the front wall 163. Horizontal, inertial loads are carried by the buttress 134 and the gooseneck 132 and distributed back to the main trailer body by the lower and upper center supports 153 and 162, respectively, as transferred by the brackets 164 and 165. Thus, no large I beams, such as the I beams 53 and 54 in the trailer 1 of FIG. 1 are required. The elimination of the I beams 53 and 54 allows the compartment 143 to have more storage space while simultaneously allowing better clearance between the bottom of the gooseneck assembly 131 and the tow vehicle (not shown).

Although the tubular members 63 have been illustrated as comprising double extruded chambers, it should be noted that single extruded tubes could be used as well. The trailer 61 has been shown as including a number of gaps 72 for air circulation purposes. However, depending upon the desired usage, e.g. for freight hauling instead of livestock transport, these gaps can be eliminated. In such a case, no vertical bracing at all is required in the trailer 61. Furthermore, in such a closed trailer, the chamber construction of the tubular members 63, etc. provide dead space for insulation purposes. Finally, while the trailer 61 has been shown as equipped with the improved gooseneck assembly 131, the trailer 61 can also be equipped with a conventional gooseneck assembly, such as the assembly 51 in FIG. 1.

It is thus to be understood that while certain forms of the present invention have been illustrated and described herein, it is not to be limited to the specific forms or arrangement of parts described and shown.

What is claimed and desired to be secured by Letters Patent is as follows:

1. A vehicle body comprising:
   a. a pair of vehicle sidewalls, each including a plurality of elongate tubular members, at least some of which are stacked atop each other and attached together via an adhesive, each said tubular member comprising:
      i. at least one chamber with an inner wall and an outer wall;
      ii. a channel formed by extensions of said inner and outer walls; and
      iii. a tongue formed by extensions of said inner and outer walls and positioned on an opposite end of said tubular member from said channel, said tongue being sized for insertion in the channel of an adjacent one of said tubular members, the relative sizes of said tongue and said channel allowing space for the collection of said adhesive, wherein;
   b. said vehicle comprises a trailer with a gooseneck assembly on the front thereof, said gooseneck assembly comprising:
      i. a storage compartment having a front wall, sidewalls and upper and lower central support members;
      ii. a vertical gooseneck removably connectable with a towing vehicle; and
      iii. a buttress connected to and extending backward from said gooseneck to said front wall of said storage compartment, a rear surface of said buttress being connected to and extending substantially from top to bottom of said compartment front wall.

2. A trailer as in claim 1, said gooseneck assembly further comprising:
   a. an upper bracket extending through said compartment front wall, said upper bracket connecting said buttress to said upper central support member;
   b. a lower bracket extending through said compartment front wall, said lower bracket connecting said buttress to said lower central support member; and wherein
   c. said sidewalls comprise a plurality of stacked, connected tubular members.

3. A trailer comprising:
   a. a trailer frame comprising a plurality of contiguous elongate metal tubular members which are stacked atop each other and attached together via an adhesive, said stacked tubular members also forming at least portions of two sidewalls and a front wall of said trailer, the lowermost ones of said stacked tubular members being substantially identical in cross section to the other tubular members; and
   b. a floor system, said floor system comprising:
      i. a plurality of modular floor members interconnected together to form said floor system;
      ii. said modular floor members extending laterally across said trailer and terminal ends of said modular floor members being connected solely directly to the lowermost ones of said tubular members in said sidewalls.

4. A vehicle as in claim 3, wherein said adhesive comprises a modified acrylic structural adhesive.

5. A trailer as in claim 3, each said tubular member comprising:
   a. at least one chamber with an inner wall and an outer wall;
   b. a channel formed by extensions of said inner and outer walls; and
   c. a tongue formed by extensions of said inner and outer walls and positioned on an opposite end of said tubular member from said channel, said tongue being sized for insertion in the channel of an adjacent one of said tubular members, the relative sizes of said tongue and said channel allowing space for the collection of said adhesive.

6. A trailer as in claim 5, wherein said tongue of each said tubular member comprises:
   a. a surface with a width which is narrower than that of the channel, said surface extending approximately perpendicular to said inner and outer walls; and
   b. said inner and outer walls tapering inward and then back outward below said surface to form a pair of grooves which extend longitudinally along the tubular member.

7. A vehicle as in claim 3, wherein each said modular floor member comprises:
   a. a web with a top surface which forms an expanse of floor;
   b. a downwardly directed hook member extending along one side of said web;
   c. an upwardly directed receiving slot extending along a second side of said web, said slot being sized to mate with the hook member of an adjacent modular member to form a junction; and
   d. at least one strengthening rib extending downward from a bottom surface of said web and running longitudinally along said modular floor member.

8. A trailer as in claim 3, said trailer including a gooseneck assembly on the front thereof, said gooseneck assembly comprising:
   a. a storage compartment having a front wall, sidewalls and upper and lower central support members;
   b. a vertical gooseneck removably connectable with a towing vehicle; and
   c. a buttress connected to and extending backward from said gooseneck to said front wall of said storage compartment, a rear surface of said buttress being connected to and extending substantially from top to bottom of said compartment front wall.

9. A trailer as in claim 8, said gooseneck assembly further comprising:
   a. an upper bracket extending through said compartment front wall, said upper bracket connecting said buttress to said upper central support member;
   b. a lower bracket extending through said compartment front wall, said lower bracket connecting said buttress to said lower central support member; and wherein
   c. said sidewalls comprise a plurality of stacked, connected tubular members.

10. A trailer comprising:
    a. a trailer frame comprising a plurality of contiguous elongate tubular members which are stacked atop each other and attached together via an adhesive, said stacked tubular members also forming at least a portion of two sidewalls and a front wall of said trailer, each said tubular member comprising:
       i. at least one chamber with an inner wall and an outer wall;
       ii. a channel formed by extensions of said inner and outer walls; and
       iii. a tongue formed by extensions of said inner and outer walls and positioned on an opposite end of said tubular member from said channel, said tongue being sized for insertion in the channel of an adjacent one of said tubular members, the relative sizes of said tongue and said channel allowing space for the collection of said adhesive; and b. a floor system, said floor system comprising:
  i. a plurality of modular floor members interconnected together to form said floor system;
  ii. said modular floor members extending laterally across said trailer, terminal ends of said modular floor members being connected directly to the lowermost ones of said tubular members in said sidewalls;

c. a gooseneck assembly on the front of said trailer, said gooseneck assembly comprising:
  i. a storage compartment having a front wall, sidewalls and upper and lower central support members;
  ii. a vertical gooseneck removably connectable with a towing vehicle; and
  iii. a buttress connected to and extending backward from said gooseneck to said front wall of said storage compartment, a rear surface of said buttress being connected to and extending substantially from top to bottom of said compartment front wall.

11. A trailer as in claim 10, said gooseneck assembly further comprising:
  a. an upper bracket extending through said compartment front wall, said upper bracket connecting said buttress to said upper central support member;
  b. a lower bracket extending through said compartment front wall, said lower bracket connecting said buttress to said lower central support member; and wherein
  c. said sidewalls comprise a plurality of stacked, connected tubular members.

12. A trailer comprising:
  a. a cargo compartment formed by a pair of vehicle sidewalls and a front wall;
  b. a gooseneck assembly positioned on the front of said cargo compartment, said gooseneck assembly comprising:
    i. a storage compartment having a front wall, sidewalls and upper and lower central support members;
    ii. a vertical gooseneck removably connectable with a towing vehicle; and
    iii. a buttress connected to and extending backward from said gooseneck to said front wall of said storage compartment, a rear surface of said buttress being connected to and extending substantially from top to bottom of said storage compartment front wall.

13. A trailer as in claim 12, said gooseneck assembly further comprising:
  a. an upper bracket extending through said storage compartment front wall, said upper bracket connecting said buttress to said upper central support member;
  b. a lower bracket extending through said storage compartment front wall, said lower bracket connecting said buttress to said lower central support member; and wherein
  c. said sidewalls comprise a plurality of stacked, connected tubular members.

* * * * *